Figure 1:
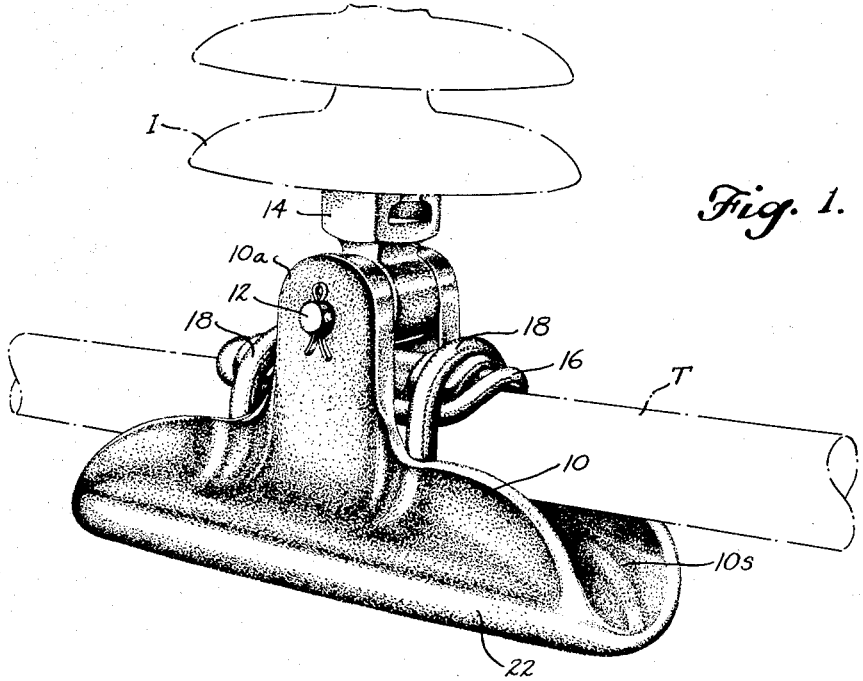

INVENTOR.
DONALD W. EXNER
BY
ATTORNEYS

INVENTOR.
DONALD W. EXNER

United States Patent Office 2,699,462
Patented Jan. 11, 1955

2,699,462

ANTICORONA TRANSMISSION LINE SUSPENSION CLAMP

Donald W. Exner, Seattle, Wash., assignor to Boeing Airplane Company, Seattle, Wash., a corporation of Delaware Application November 13, 1950, Serial No. 195,341

7 Claims. (Cl. 174—140)

This invention relates to improvements in high-voltage power transmission line suspension clamps with particular reference to the corona problem of such clamps at line voltages of about 230 kilovolts and higher. Conventional line suspension clamps have been found inadequate to maintain corona discharge below objectionable radio interference and power loss level when line voltage is raised into the operating range just indicated, as required by the need for greater operating efficiency and power capacity of present-day power transmission networks.

In the accepted conventional type of line suspension clamp for lower-voltage operation, the line conductor held in the clamp is gripped between a lower supporting saddle and an upper hold-down shoe. Clamping pressure is applied to the conductor between these elements by U-bolts which extend up and over the shoe and straddle the conductor. The lower ends of these bolts, projecting downward from the bottom of the saddle or clamp body, are threaded to receive nuts by which the desired clamping pressure is established. Because of its advantageous mechanical features this general type of clamp has for some time been standard equipment at voltages below the range indicated above. Although the older malleable iron and forged steel clamps are presently being superseded by nonmagnetic or partially nonmagnetic types because of the reduction in magnetic losses thereby obtainable, the basic form has remained the same for all voltages, for years.

However, at the ultra-high voltages now of interest, it is found that the projecting lower ends of the U-bolts, for example, cause pronounced corona discharge. While some improvement in respect to this corona difficulty resulted from the use of specially shaped nuts on the U-bolt ends such an improvisation proved ineffective at voltages in the order of 230 kilovolts and higher, indicating that the problem was more fundamental in nature.

An object of the present invention is a transmission line suspension clamp generally of the type indicated, which prevents corona discharge from the ends of the clamp bolts or equivalent projecting elements without objectionably increasing the weight of the clamp, nor impairing its mechanical characteristics as a transmission line conductor support.

Still another object of the invention is such an improved anti-corona transmission line suspension clamp which is relatively compact and thereby requires no appreciable increase in normal clearances between line phase conductors.

Described briefly, the invention broadly comprises a suspension clamp, the saddle or body portion of which below the supported line conductor is extended generally horizontally and downward in the form of a skirt. The downwardly opening recess thus formed in the bottom of the clamp body constitutes a shielding pocket for the U-bolt ends and nuts, preventing corona discharge therefrom. The peripheral edge of such skirt, extending downward approximately to the level of the U-bolt ends, is rounded at a large radius in the order of the line conductor radius, at the sides of the clamp, while at opposite end portions thereof directly beneath the conductor such radius of rounding may be materially reduced with corresponding saving of weight because of shielding afforded by the line conductor itself.

In the preferred and herein illustrated form of the improved transmission line suspension clamp the skirt portion of the lightweight clamp body is generally oblong or elliptical in plan view, the major axis thereof extending parallel to the line conductor. Certain additional savings in weight and provision of maximum wrench clearance within the shielding pocket around the U-bolt nuts are obtained by decreasing the cross-sectional rounding radius of the edge bead of the skirt entering the pocket as compared with the rounding radius necessary on the outside periphery thereof to prevent corona on such bead at the ultra-high voltages of interest.

These and other features, objects and advantages of the present invention including certain details of construction of the preferred form thereof will become more fully evident from the following detailed description based upon the accompanying drawings illustrating such preferred form. It will be understood, however, that certain changes or modifications in the detailed form or construction of the improved transmission line suspension clamp may be made without departing from the underlying essentials thereof.

Figure 2:
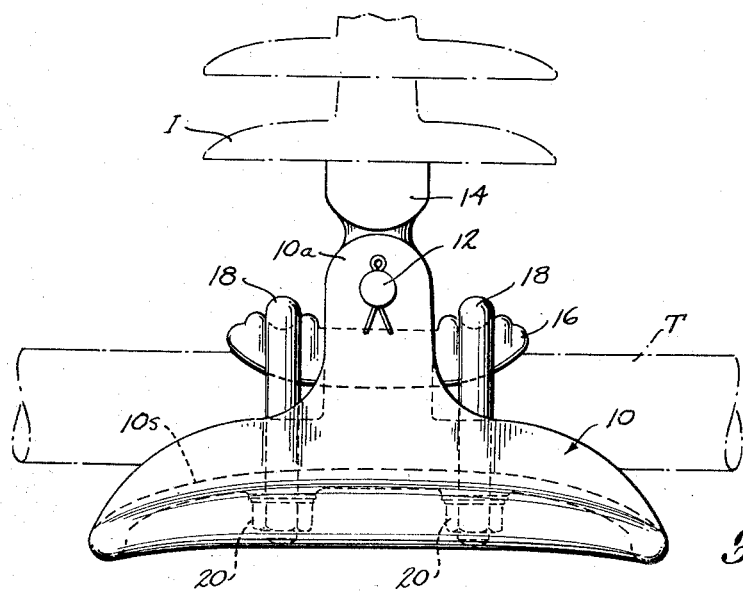
Figure 3:
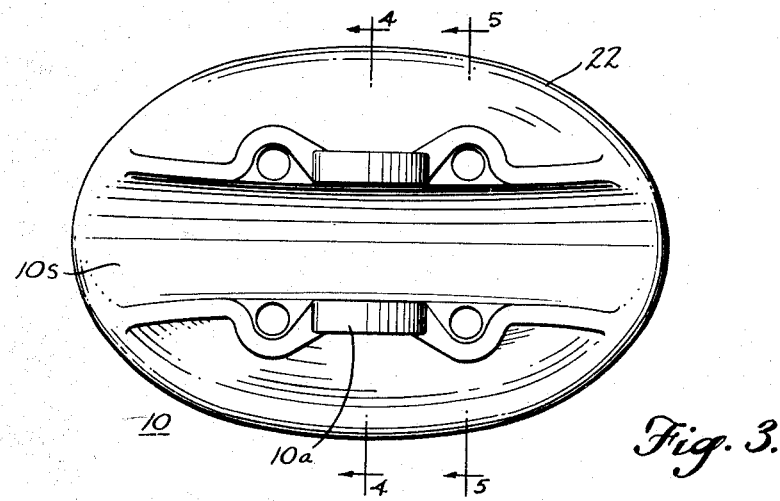
Figure 4:
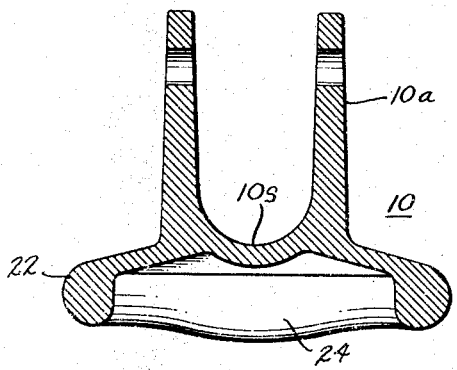
Figure 5:
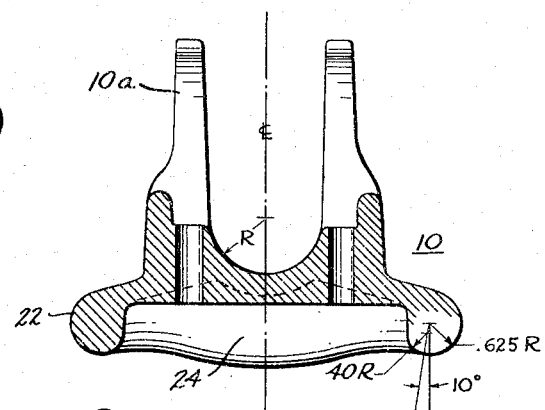

Figure 1 is a perspective view of the improved transmission line suspension clamp.
Figure 2 is a side view of the clamp.
Figure 3 is a plan view of the clamp body.
Figure 4 is a transverse sectional view of the clamp body taken on line 4—4 in Figure 3.
Figure 5 is a transverse sectional view of the clamp body taken on line 5—5 in Figure 3.

As shown, the clamp body 10 is suspended pivotally from the lower end of the usual string of insulators I, as shown by dotted lines in Figure 1 and 2. The connection is formed by a pivot pin 12 which passes through the ends of upward arm extensions 10a of clamp body 10, and the connector 14 received between such arm extensions. The horizontal axis of pivot pin 12 is transverse to the axis of transmission line T held in the sling or saddle 10s formed by the lower portion of clamp body 10.

The armor-rod enwrapped transmission line T is clamped firmly against the convex upper surface of the saddle by hold-down means including the hold-down shoe or keeper 16 and the U-bolts 18 as in the conventional arrangement. The threaded lower ends of such U-bolts project through holes in the base of the saddle portion 10s and below the bottom side thereof to receive the securing nuts 20 for establishing the desired clamping pressure.

Conventionally the body portion of a transmission line suspension clamp of this general type constitutes simply a sling having a plain bottom side from which the lower ends of the U-bolts project into the open. In that case it has been found that pronounced corona discharge occurs from the ends of these bolts when the voltage of the line is increased into the range previously mentioned. After study and experimentation, the present improved suspension clamp overcoming these corona difficulties in the advantageous manner previously outlined resulted.

In accordance with the invention an anti-corona skirt or flange is carried by the clamp body 10 projecting generally outward and downward therefrom around its lower periphery beneath the transmission line T. Such skirt or flange surrounds the projecting ends of the bolts 18 and forms a shielding pocket in the bottom of the clamp body which prevents occurrence of objectionable corona discharge from such bolt ends and nuts threaded thereon.

In the illustrated form, this skirt 22 is an integral cast part of the clamp body 10 and in plan view is of generally elongated or elliptical form (Figure 3). In general appearance the resulting lower portion of the clamp body resembles a shallow bell opening downward, the major axis of the generally elliptical flange being parallel to the axis of transmission line T. The recess or shielding pocket 24 receiving the bolt ends need be no deeper than approximately the downwardly projecting length of such bolts from the bottom side of the saddle portion, such that the general plane of the skirt's lower edge lies approximately at or just below the bolts' lower extremities. If the bolt ends project far below such plane, corona discharge tends to develop whereas if the downward projection of the skirt is much greater than the projection of the bolts, the deeper skirt not only adds unduly to the weight of the clamp body but it makes access to the nuts 20 with a wrench more difficult. It will be understood, of course, that the projecting length of the bolts is no more than necessary for mechanical purposes in the assembling and tightening of the clamp parts.

For purposes of this specification and the drawings it is assumed that the transmission line conductor is wrapped with armor rod where it passes through the clamp, in the usual manner, so that the designation "T" in the drawings refers to the wrapped conductor. The conductor itself, whose radius is the basis upon which maximum corona-free line voltage is determined, is materially smaller. A clamp saddle cross-sectional radius of 1.2 inches would receive an armor wrapped conductor of about 0.7 inches radius, for example.

The drawings are quite accurate with respect to the preferred shape and relative proportions of the shield or skirt portion of clamp body 10. The bead formation comprising the peripheral edge portion of the shielding skirt 22 has an outside radius of rounding, at the sides of the skirt, of approximately 0.9 radius of the line conductor (without armor), such radius of rounding being materially reduced at the lower inside corner of such bead formation where it curves upward and inward to fair into the inside wall of the shielding pocket 24. The rounding of such inside lower corner of the bead occurs at a radius of approximately 0.6 the radius of such line conductor and commences at about 10° inside the vertical line passing through the radius center of the outside curve as shown in Figure 4. It is found that this material reduction in radius of rounding of the bead formation inside the shielding pocket effects worthwhile savings in weight, yet is permissible from the corona standpoint. Such reduction in radius of the bead also permits a lower overall width of the clamp without restricting the open space inside the shielding pocket for wrench clearance around the U-bolt nuts 20.

At the end portions of the illustrated form of the skirt its lower edge dips down somewhat as shown in Figure 5, for example, to provide vertical clearance for the line T, it being noted that the troughed upper surface of the saddle portion 10s supporting the line T curves downward toward opposite ends thereof to accommodate flexure of the conductor. However, this dip is but an incidental part of the illustrated design, and if a somewhat deeper skirt is used as it might be to accommodate longer bolts, the bottom edge of the skirt would lie in a single plane all around. In order to effect further weight savings, advantage is taken of the discovery that the radius of curvature in cross section of the bead formation at the end portions of the skirt beneath line T may be materially reduced below the corresponding outside radius of curvature of such bead formation at the side portions of the skirt. The comparison may be seen by reference to Figure 2 showing the bead cross section in outline at the ends of the skirt, and to Figure 4, for example, showing the bead cross section at the side portions of the skirt. This permissible reduction in bead radius at the ends of the skirt, which may be reduced to approximately three-fourths of the radius at the sides thereof, without corona discharge therefrom, is evidently made possible because of the shielding effect of the transmission line T itself. As illustrated in Figure 1 a smooth transition in bead cross section between side and end portions occurs in the vicinity of the points on the skirt's periphery at which the trough sides of the saddle portion generally terminate, although these locations are not critical.

When the improved anti-conora clamp having the features described is constructed of aluminum or equivalent non-magnetic material, for example, the weight of the clamp even with the anti-corona shielding skirt formation, as a factor in transmission line mechanical design, is practically negligible.

I claim as my invention:

1. In a suspension clamp for at power transmission line conductor comprising a clamp body adapted to be suspended from line insulator suspension supports and having a lower saddle portion to hold the transmission line conductor therein, and conductor hold-down means cooperating with said saddle portion and including securing elements having lower terminal end portions projecting downward from the bottom of said saddle portion, anti-corona skirt means of conductive material carried by said clamp body saddle portion to project generally outward and downward directly from the lower periphery of said saddle portion beneath a transmission line conductor held in said saddle portion, said skirt surrounding and forming a downwardly opening shielding pocket for said securing element lower end portions to prevent occurrence of corona discharge from such securing element terminal end portions recessed in said pocket.

2. The power transmission line suspension clamp defined in claim 1, wherein the anti-corona skirt means peripheral edge comprises a rounded bead formation the outer surface of which generally along the sides of the skirt is rounded at a radius generally in the order of the radius of the line conductor supported by the clamp.

3. The power transmission line suspension clamp defined in claim 1, wherein the anti-corona skirt means peripheral edge comprises a rounded bead formation the outer surface of which generally along the sides of the skirt is rounded at a radius generally in the order of the radius of the line conductor supported by the clamp, and generally along the ends of the skirt directly beneath such line conductor is rounded at a materially reduced radius.

4. The power transmission line suspension clamp defined in claim 1, wherein the anti-corona skirt means is generally elliptical in plan view, the major axis of such generally elliptical skirt means being parallel to the axis of the line conductor held in the clamp.

5. An electric power transmission line conductor suspension clamp comprising means forming a transmission line conductor elongated supporting saddle having a longitudinal trough therein arched upwardly longitudinally thereof to receive the conductor and having upwardly projecting suspension means at the sides thereof for connection to a transmission line suspension insulator, clamp means for clamping the conductor against the base of said saddle trough including a plurality of threaded bolt elements passing through the bottom of said saddle and having securing nuts threaded on the lower ends thereof, and anti-corona skirt means formed integrally with said saddle projecting generally outwardly and downwardly from substantially the entire lower peripheral portion thereof directly to form an oblong recess in the bottom of the suspension clamp and surround said threaded bolt element ends and securing nuts threaded thereon.

6. An electric power transmission line suspension clamp, comprising a generally oblong cupped body portion having a concave lower side and a generally convex upper side, means forming a longitudinally arched trough on the upper side of said body portion for receiving and supporting a transmission line conductor therein, suspension means projecting upwardly from the sides of said trough on said body portion for connection to a transmission line suspension insulator, and clamp means for holding the transmission line conductor against the bottom of said trough including elements passing through said body portion to project from the concave lower side thereof downwardly not appreciably beyond the lower rim of said body portion, whereby said rim effectively shields said bolt ends against corona discharge at relatively high transmission voltages.

7. The transmission line conductor suspension clamp defined in claim 1, wherein the anti-corona skirt means is generally elliptical in plan view, the major axis of such generally elliptical skirt means being parallel to the axis of the line conductor held in the clamp, and further wherein the anti-corona skirt means peripheral edge comprises a rounded bead formation the outer surface of which generally along the sides of the skirt is rounded at a radius generally in the order of the radius of the line conductor supported by the clamp, and generally along the ends of the skirt directly beneath such line conductor is rounded at a materially reduced radius, the bead formation radius of rounding within the shielding pocket being materially reduced relative to the outer surface radius thereof along the sides of the skirt, the securing element terminal end portions projecting downwardly from the saddle portion approximately to the general plane of the lower edge of the skirt means.

References Cited in the file of this patent

UNITED STATES PATENTS

| | | |
|---|---|---|
| 1,521,743 | Austin | Jan. 6, 1925 |
| 1,997,627 | Casey | Apr. 16, 1935 |
| 2,028,894 | Bovard | Jan. 28, 1936 |